(12) United States Patent
Harford

(10) Patent No.: US 7,184,252 B2
(45) Date of Patent: Feb. 27, 2007

(54) SURGE PROTECTOR WITH INPUT TRANSFORMER

(76) Inventor: Jack R. Harford, 111 Harmony School Rd., Flemington, NJ (US) 08822

( * ) Notice: Subject to any disclaimer, the term of this patent is extended or adjusted under 35 U.S.C. 154(b) by 111 days.

(21) Appl. No.: 11/165,863

(22) Filed: Jun. 25, 2005

(65) Prior Publication Data
US 2006/0007621 A1    Jan. 12, 2006

Related U.S. Application Data

(63) Continuation-in-part of application No. 10/889,369, filed on Jul. 12, 2004, now Pat. No. 7,068,487.

(51) Int. Cl.
H02H 3/22 (2006.01)

(52) U.S. Cl. ........... 361/111; 361/118

(58) Field of Classification Search .......... 361/111, 361/118
See application file for complete search history.

(56) References Cited

U.S. PATENT DOCUMENTS

| | | | |
|---|---|---|---|
| 4,862,307 A * | 8/1989 | Larson et al. | 361/38 |
| 4,870,528 A | 9/1989 | Harford | 361/56 |
| 4,870,534 A | 9/1989 | Harford | 361/58 |
| 5,617,284 A * | 4/1997 | Paradise | 361/58 |
| 5,621,625 A | 4/1997 | Bang | 363/21.1 |
| 6,347,045 B1 * | 2/2002 | Poon et al. | 363/39 |
| 6,385,029 B1 * | 5/2002 | Pennington | 361/111 |
| 2003/0165035 A1 | 9/2003 | McCook et al. | 361/21 |
| 2004/0004799 A1 | 1/2004 | Elder | 361/93.5 |

* cited by examiner

*Primary Examiner*—Burton S. Mullins
*Assistant Examiner*—Luis E. Roman
(74) *Attorney, Agent, or Firm*—Kenneth P. Glynn, Esq.

(57) ABSTRACT

A surge protector for alternating current service includes at least an incoming hot line and a neutral line, but usually includes an incoming hot line, an incoming neutral line and a safety ground line. The surge protector has an input transformer and a series connected transformer with input connection to the input transformer secondary winding, and connected in series to a non-linear surge suppression circuit, and therefore has a gross output connection to the non-linear surge suppression circuit, and a low impedance input to the secondary winding of the series connected transformer from the non-linear surge suppression circuit, and has a surge cancelled hot line output connection.

16 Claims, 11 Drawing Sheets

SURGE PROTECTOR WITH INPUT TRANSFORMER

REFERENCE TO RELATED APPLICATION

This application is a Continuation-In-Part of U.S. patent application Ser. No. 10/889,369, filed on Jul. 12, 2004 now U.S. Pat. No. 7,068,487, entitled "SURGE PROTECTOR", by the same inventor herein.

BACKGROUND OF THE INVENTION

1. Field of the Invention

The present invention relates to surge protection, and more particularly to a surge protector that utilizes a non-linear surge suppression circuit with a series connected transformer, and includes an input transformer. This surge protector is useful for single phase service, and may be useful in three phase service applications wherein three transformers (one for each hot line) are used. In the three phase service surge protector of the present invention canceling signals are added by each transformer output.

2. Information Disclosure Statement

The following prior art is representative of the state of the art in the field of surge protection:

U.S. Pat. No. 4,870,528 discloses a surge suppressor comprises a first series circuit having a first inductance and a first alternating voltage limiter, including at least a first capacitance and a bidirectionally conductive rectifying circuit for charging the first capacitance, coupled between first and second input terminals for limiting surge currents and voltage excursions coupled to first and second load output terminals. The first alternating voltage limiter further comprises a sensing circuit for sensing at least one of the charging current supplied to and the voltage developed across the first capacitance. An auxiliary energy storage circuit and a normally open switching device responsive to the sensing circuit are provided for coupling the auxiliary energy storage circuit across the first capacitance during high energy surge conditions.

U.S. Pat. No. 4,870,534 discloses a surge suppressor for repeatedly protecting a load against surges occurring on A-C power mains from lightning surges. It includes a first series circuit having a first inductance and a first alternating voltage limiter, including at least a first capacitance and a bidirectionally conductive rectifier circuit, coupled between first and second input terminals. The first inductance conducts substantially all of the current supplied from the A-C power mains. A second series circuit comprising a second inductance and second alternating voltage limiter, including at lest a second capacitance and a second bidirectionally conductive rectifier circuit, is coupled across the first alternating voltage limiter and is coupled to first and second output terminals. The first voltage excursions passed to the second series circuit to first levels while the second series circuit is arranged for further limiting surge currents and voltage excursions passed to the output terminals to second levels less than first levels.

U.S. Pat. No. 5,617,284 discloses a power surge protection apparatus that protects circuitry from electrical surges induced in an alternating current power connection to the circuitry. The apparatus includes first, second, and third stages, which serve to clamp and dissipate superfluous energy, such as that from a power surge, on the power connection. The first stage comprises a metal oxide varistor MOV 1 and a capacitor for helping to clamp and dissipate large-duration continuous surges on the power connection. The second stage comprises an RC-LC filter with resistor R1, capacitor C2, inductor L1, and capacitor C3. Moreover, the second stage has a metal oxide varistor MOV 2. The second stage further comprises a bifilar transformer T1 situated between the connections. Specifically, the inductors of the bifilar transformer T1 are disposed in series with the connections of the power connection, and the connections are twisted about each other and wrapped in a bifilar winding configuration about a common core.

U.S. Pat. No. 5,621,625 discloses a surge protection circuit for switching mode power supply utilizing the switching phase difference of substantially 180 degree between primary and secondary coils of a switching power supply transformer that snubs transformer by attenuating the surges induced during ON/OFF operations of a switching transistor which controls the power supply transformer. Accordingly, heat caused during the ON/OFF operation of the switching transistor is reduced and secondary rectifier diodes connected to the secondary winding of the power transformer are protected from damages. The surge protection circuit uses a pair of capacitors connected in series between a control terminal of the primary coil and an output terminal of the secondary coil of the switching power supply transformer for snubbing bi-directional surges induced by the ON/OFF operation of the switching transistor.

United States Patent Application Disclosure No. 2003/0165035 A1 describes a system and method for conditioning a power transmission, thereby eliminating adverse characteristics from the power transmission. The system selectively includes a voltage surge protector, and EMI/RFI filter and at lest one inrush current suppressor integrally formed into a single system. To condition an incoming power transmission, the power transmission is passed through the voltage surge protector to eliminate any abnormal voltage spikes. The power transmission is then passed through an improved EMI/RFI filter having a dual output. The outputs of the EMI/RFI filter lead into a first inrush current suppressor. The inrush current suppressor limits the amperage of the power transmission for a predetermined period of time and then permits unrestricted current flow.

United States Patent Application Disclosure No. 2004/0004799 A1 describes a surge suppression device includes a first and second coil positioned in close proximity to one another such that the windings of each coil are disposed at an angle thereto. In a preferred embodiment, the coils are disposed such that the windings of each coil are placed at a right angle (90 degrees) to one another. However, angles of varying degree can be employed. Varying configurations of the coil winding placement include a "sandwiched" type configuration, a "one on the top of the other" configuration as well as an intertwined configuration. Each embodiment employs additional surge elements such as metal oxide varistors (MOVs). It is unnecessary to employ any ferrous material core for any of the coils used in the novel device of the present invention.

Notwithstanding the prior art, the present invention is neither taught nor rendered obvious thereby.

SUMMARY OF THE INVENTION

The present invention relates to a surge protector for a single phase alternating current service, and that service includes at least an incoming neutral line and incoming hot line, but usually includes an incoming hot line, an incoming neutral line and a safety ground line. The safety ground line is optional for the performance of the present invention surge protector but is now code required in all new structures by many governmental bodies. The surge protector has an input transformer, with input connection means for connection to the incoming hot line, followed by a series connected transformer connected in series to a non-linear surge suppression circuit, and therefore having a gross output connection to the non linear surge suppression circuit, and further having a low impedance input to the secondary winding of the series connected transformer from the non-linear surge suppression circuit, and having a surge cancelled hot line output connection means. By "series connected transformer" as used herein means a series connected conventional transformer (multiple windings) or an autotransformer (tapped winding). The present invention surge protector also has the non-linear surge suppression circuit having an input connection means from the single phase service neutral line, and is connected with the gross output connection means of the transformer, and has means for returning the suppressed surge signal to the transformer secondary which is wired in opposite phase, and having a neutral line output connection means. The input transformer may be an isolation transformer, a voltage step up transformer or a voltage step down transformer. The non-linear surge suppression circuit starts to limit the surge voltage at a voltage above the peak of the power wave voltage, and the series connected transformer senses the surge current. The secondary winding then supplies a signal of opposite phase to the incoming surge at the output after the clamping circuit, which effectively cancels the residual surge voltage, rendering the residual surge benign at the output.

In many preferred embodiments, the surge protector is for a single phase alternating current service, the service including an incoming hot line, an incoming neutral line and a safety ground line wherein the device further includes a three prong male alternating current plug at it's upstream end and a three slot female alternating current receptacle at it's downstream end.

The series connected transformer of the present invention surge protector has a primary winding and a secondary winding; an alternate construction would be a tap on the primary.

The present invention surge protector includes embodiments wherein three phase service is used in several configurations (wye, delta, grounded, ungrounded, etc.) The preferred configuration for use within buildings will be described. In the present invention surge protector for three phase alternating current service, the preferred service configuration includes three incoming hot lines designated phase A, phase B, and phase C, a safety ground line, and a neutral line. The surge protector has three input transformers and three series connected transformers with input connection means, one transformer connected to one non-linear surge suppression circuit for each phase, with input connection means for connection to each phase, and each transformer primary is connected in series to said non-linear surge suppression circuit. It therefore has a gross output connection to the non-linear surge suppression circuit, and further has a low impedance input to the secondary winding of the series connected transformer from the non-linear surge suppression circuit, and has a surge canceled output connection means for each phase. It has the non-linear surge suppression having an input connection means from the three phase neutral wire (optionally the three phase ground wire), and being connected with the gross output connection means of the transformer primary, having means for returning the suppressed surge signal to the transformer secondary which is wired in opposite phase to provide a canceling signal, and having a ground line and neutral line output connection means. Each non-linear surge suppression circuit starts to limit the surge voltage at a voltage above the peak of the power wave voltage with respect to the neutral line (or optionally the ground line), and the series connected transformer primary senses the surge current and the secondary winding supplies a signal of opposite phase to the incoming surge at the output after the clamping circuit, which effectively cancels the residual surge voltage, rendering the residual surge benign at each output.

BRIEF DESCRIPTION OF THE DRAWINGS

The present invention should be more fully understood when the specification herein is taken in conjunction with the drawings appended hereto wherein:

FIG. 1 illustrates a flow diagram of one embodiment of the present invention surge protector;

FIG. 2 shows a circuit diagram of one embodiment of a single phase present invention surge protector;

FIGS. 3 and 5 show waveform results for present invention surge protectors;

FIG. 4 shows a circuit diagram of a preferred embodiment of a single phase present invention surge protector;

FIG. 6 illustrates another embodiment of the present invention surge protector for three phase service;

FIG. 7 shows a circuit diagram of one embodiment of a single phase present invention surge protector; and, FIG. 8 illustrates waveform results the present invention surge protector of FIG. 7 utilizing the non-linear surge suppression circuit of FIG. 4A.

DETAILED DESCRIPTION OF THE PRESENT INVENTION

Figure 1:
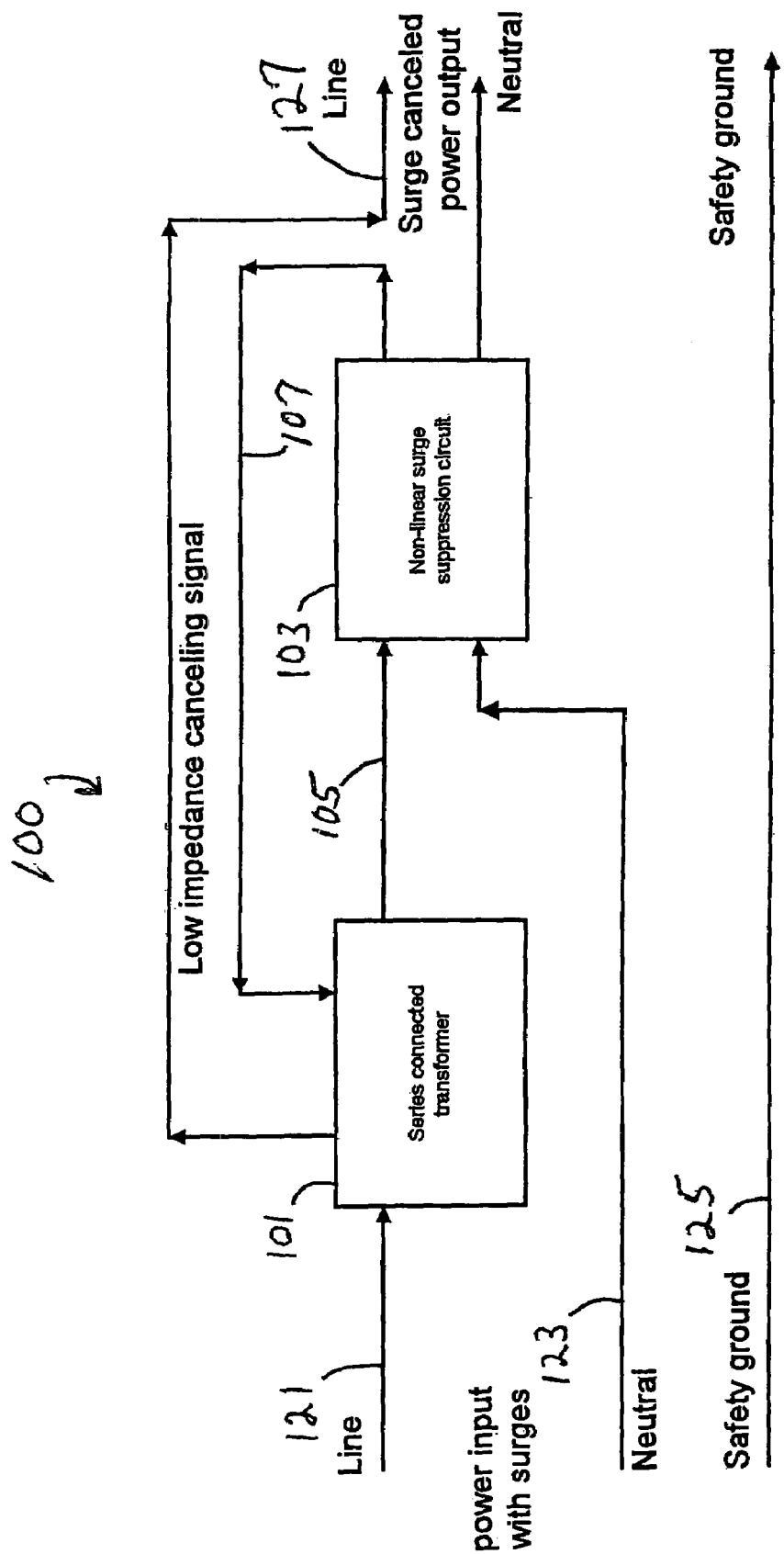
FIGS. 1 through 6 are describing the present invention as claimed in the parent application to this application and are set forth in detail for an understanding of the basic concepts before introduction of the present invention input transformer.

Most electronic equipment is powered from "switch mode" power supplies. These power supplies generally take their power from the peak of the power wave, making them particularly susceptible to powerline surges which exceed the power wave peak voltage.

A powerline surge suppressor is described which, due to the phase cancellation property of a transformer connection, lets extremely little surge energy through to protected equipment, making it particularly effective for protecting such switch mode power supplies. The low surge energy let-through can be achieved by using a canceling signal from a secondary winding coupled from a transformer primary winding which is series connected to the power line carrying the incoming surge. By virtue of the ability to select the phase of the secondary (canceling) winding, a canceling signal can be added in series with the output following the suppressing circuit, to produce exceptionally low let-through voltage.

Powerline surges within a building can be as large as 6,000 Volts, 3,000 Amperes, with a duration of 50 microseconds, according to the industry standard ANSI C62.41.

UL uses 6,000 Volts, 500 Amps for their UL1449 safety duty factor (endurance) testing, and for establishing their standard SVR (Suppressed Voltage Rating), and 6,000 volts, 3,000 amps for their Adjunct Classification (performance certification). Powerline surge suppressors should serve the purpose of reducing such electrical surges to benign levels of voltage, current and duration (energy).

Most equipment today is powered from switch-mode power supplies. These supplies take their power from the peak of the power wave, where they offer a very low impedance to the power wave during the peak period of the wave. This is important for understanding the following.

Two recent situations make conventional fixed voltage surge clamping products relatively ineffective in light of switch-mode power supply characteristics.

First, utility companies lower their powerline voltage during "brown-out" situations to conserve available electrical power. This voltage may be 108 Volts RMS (152 Volts peak), or even lower. Since fixed clamping level protection devices must be set to clamp at a voltage higher than the highest expected voltage (typically 10% above nominal 120 volts) (132 volts RMS, or 187 Volts peak), plus the clamping component tolerance, the typical clamping component is rated for 150 Volts RMS (212 Volts peak). With a 10% tolerance, the clamping voltage would range from 135 to 165 Volts RMS (190 to 233 Volts peak).

If the powerline Voltage is 108 Volts RMS (153 Volts peak), and the fixed clamping component is 165 Volts RMS (233 Volts peak), then absolutely no surge suppression takes place until after a surge voltage increment of about 80 Volts peak! Such a large surge voltage increment before any surge suppression even starts, can result in very large currents flowing into the "protected" power supply, damaging or putting these supplies under severe stress!

Second, during rolling blackouts, very large surges are created as the magnetic fields around all the current carrying wires collapse. These wide area regions of multiple surges put significant stress on power supplies and surge components alike, making effective, reliable suppression increasingly important.

The present invention surge protection has a circuit with the characteristic that it will effectively cancel the effects of a surge by providing an opposing signal to the residual surge left after using conventional suppression circuits and adding an opposing signal to the output, thereby dramatically reducing the surge voltage let through to the protected equipment.

The present invention surge protection device has a circuit that includes an input transformer that may be an isolation transformer, a step up voltage transformer, or step down voltage transformer. The subsequent in-series connected conventional transformer can be reduced in size because the input transformer leakage inductance can substitute for some or much of the otherwise needed inductance of the series connected transformer. The input transformers used in the present invention devices can be constructed to handle wide ranges of power and have predetermined transformer leakage inductance. An artisan in the field has the skill to construct input transformers, given the present invention disclosure and identified power applications.

The present invention surge suppressor includes a transformer primary winding connected in series with the "hot" wire, the input transformer and a non-linear surge suppression circuit. The series transformer primary winding connection allows the transformer to be responsive to surge current flowing in the surge suppression circuit, as all the surge current flows in the primary winding.

The surge suppression circuit can consist of combinations of inductors, capacitors within a diode bridge, MOV's (Metal Oxide Varistors), gas tubes, silicon diodes, silicon avalanche diodes (SADs) or any non-linear element(s) suitable for surge suppression applications.

FIG. 1 illustrates a flow diagram of one embodiment of the present invention surge protector. Device 100 includes a series connected transformer 101 and a non-linear surge suppression circuit 103. There is incoming single phase alternating current service with hot-line 121, neutral line 123 and ground line 125. Series connected transformer 101 is connected to incoming hot-line 121 (hard wired, conventional plug, clip or otherwise). In turn, series connected transformer 101 has a gross output connection 105 to non-linear surge suppression circuit 103 neutral line 123 is connected to non-linear surge suppression circuit, as shown. The non-linear surge suppression circuit 103 starts to limit the surge voltage at a voltage above the peak of the power wave voltage. Non-linear surge suppression circuit 103 returns a surge suppressed signal to series connected transformer secondary via a feedback connection 107, with the transformer secondary phased to cancel the residual surge voltage. Thus, the device 100 senses the surge current and supplies a signal of opposite phase to the suppressed surge, effectively canceling the residual surge voltage, rendering the residual surge benign at hot line output 127.

Figure 4:
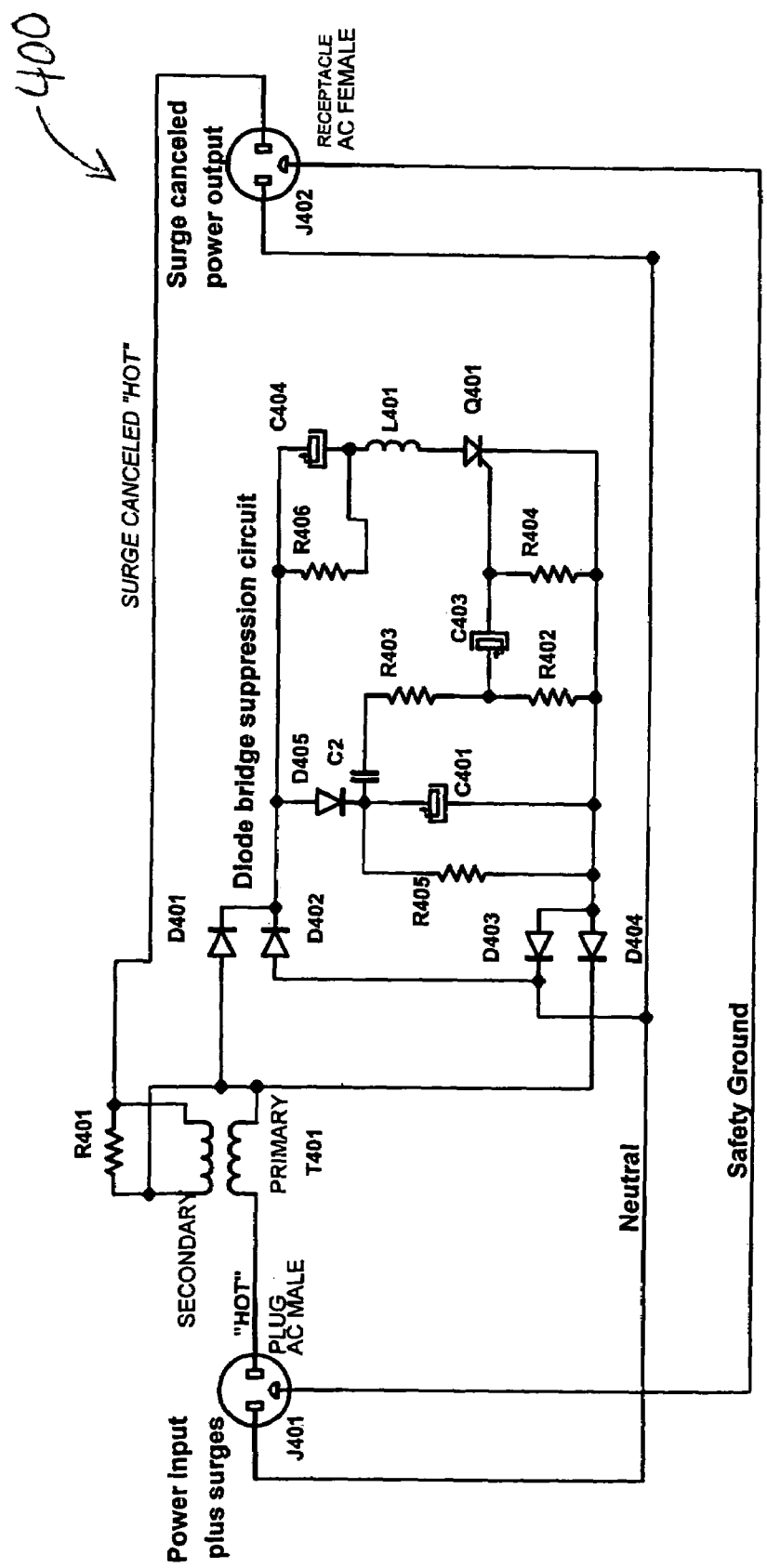
Figure 4A:
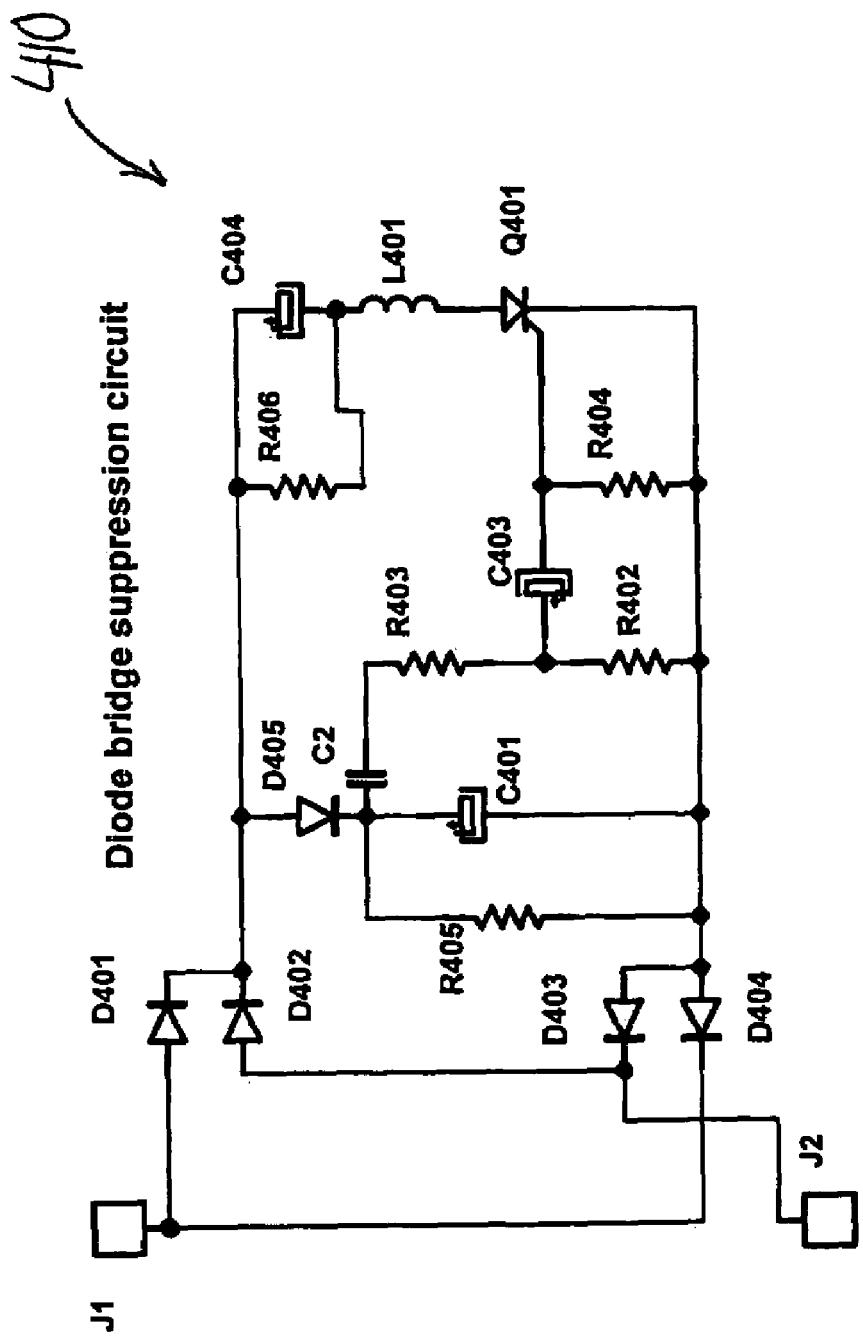
FIG. 4A shows an alternative non-linear surge suppression circuit for some embodiments to substitute for that shown in FIG. 4.

The non-linear surge suppression circuit 103 may be any non-linear surge suppression circuit such as I described above, using Metal Oxide Varistors, SADs, or similar fixed clamping level surge suppression components. However, a preferred circuit uses dynamic clamping, whereby surge suppression starts as soon as surge voltage exceeds the power wave peak voltage. FIG. 4a shows an example of a preferred dynamic clamping circuit 410 that can be substituted for an MOV or similar clamping component. FIG. 4 shows an example of typical implementation of this preferred configuration 400, also described in more detail in my U.S. Pat. No. 6,728,089, entitled "Surge suppressor for wide range of input voltages."

For fixed clamping elements such as MOVs and SADs, voltage clamping does not begin until the clamping onset voltage is exceeded. Since this clamping onset level must be higher than the highest expected powerline peak voltage to prevent the suppressor from conducting on the power wave and overheating, the clamping onset level can be quite high, typically 210 volts peak for 120 vac rms power. Additionally, the clamping is not perfect and the clamping voltage continues to rise past the clamping onset voltage as the surge current into the MOV increases due to the internal resistance of the clamping circuit (3,000 amperes may flow in the MOV or other clamp circuit would result in 300 volts in addition to the initial 210 volts clamping onset voltage).

By preceding such a voltage clamping circuit with a series-connected transformer, the resulting overall surge let-through voltage can be reduced to benign levels by virtue of the current limiting properties of the series transformer inductance, and by adding the canceling signal from the series connected transformer secondary winding to the power output connection after the voltage clamping circuit. The precise transformer constants for optimum cancellation will depend on the specific characteristics of the MOV or other clamping circuit.

A transformer (or autotransformer) suitable for sample 120 vac, 60 Hz applications will have a normal coupling of 0.4 (normal coupling range of about 0.3 to 0.9, and a preferred normal coupling range of about 0.35 to about 0.65)

and the following unitized parameters: divide the unitized parameters supplied by the maximum rated load current for each application:

Unitized Parameters:
Primary resistance: 0.6 ohms.
Primary inductance: 1200 microhenries The secondary will have the following unitized parameters:
Resistance: 0.03 ohms.
Inductance: 60 microhenries Optimum overall performance will be achieved by optimizing the previous recommended starting values in conjunction with the actual surge suppressor components.

For example, a transformer for 120 VAC, 60 Hz, 20 Amperes maximum load would have the following parameters:
Primary resistance: 0.03 ohms.
Primary inductance: 60 microhenries
Secondary resistance: 0.0015 ohms.
Secondary inductance: 3 microhenries.
Nominal coupling: 0.5

The transformer inductance's and resistances can be doubled for 240 vac 60 Hz applications, and scaled similarly for different voltages.

Figure 2:
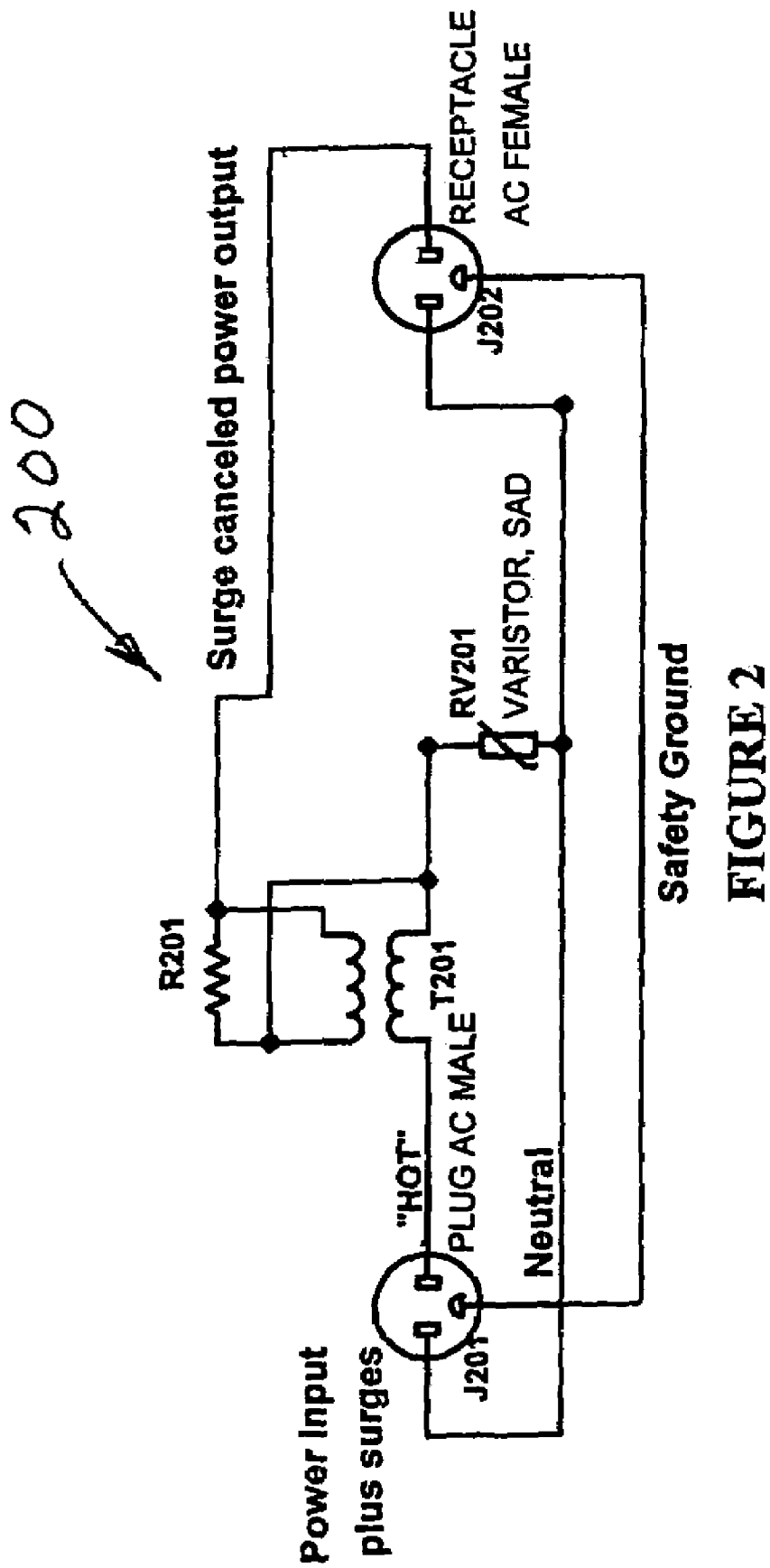

FIG. 2 shows the present invention surge suppressor circuit for a series-connected transformer and 20 amp, 120 vac 60 Hz load. The components are as follows:

The single phase service 120 vac has a typical three line set up with a hot line, a neutral line, and a safety ground, access via conventional three prong plug is assumed for this example. Thus, the present invention device 200 has a three-prong male AC plug J201, basically, is a powerline plug for connecting to normal 120 vac 60 Hz power, although the circuit could also be "hard wired" in a panel-mount application.

T201 is a transformer or autotransformer with a primary inductance of 60 microhenries, DC resistance of 0.03 ohms, a secondary inductance of 3 microhenries and a coefficient of coupling of 0.5. R201 is a secondary damping resistor across the transformer secondary winding used to shape the resulting voltage waveform to be consistent with the clamping circuit response, in the range of 0.01 to 0.20 ohms. RV201 is a Metal Oxide Varistor (MOV) or a similar clamping component with a nominal clamping onset level of 210 volts peak, typical of Varistors for use with 120 vac power. As shown, it is wired consistent with FIG. 1 above.

MOVs and SADs (Silicon Avalanche Diodes) have similar clamping characteristics for RV201, but MOVs are sacrificial and wear out with use, while SADs do not wear out up to their maximum rating, but are generally available with lower energy or power ratings. A more effective circuit would substitute the circuit of FIG. 4a for RV201 in FIG. 2.

Since the neutral wire is tied to earth ground where the power enters a building for 120/240 vac systems as used in the USA, surges can only enter a building on the "hot" wires. The transformer (T201) primary is therefore connected between the incoming "hot" wire and the clamping circuit (MOV,SAD, dynamic clamp), so it can monitor the incoming surge current flowing in the clamping circuit. When a surge is present, surge current flows in the transformer primary, producing a canceling signal in the secondary or tapped winding. For a 6,000 volt surge, approximately 5,600 volts will appear briefly across T201 primary. With a MOV clamp onset of 210 volts, and 3,000 amperes surge current available, the voltage across the MOV may climb to about 400 volts due to the momentary high surge current flow. A transformer designed for this application could supply an opposite phase signal of typically 100 volts, reducing the surge passed on to the output receptacle or load from 400 volts peak to 300 volts peak or less, making a dramatic improvement in performance. Transformer couplings greater than 0.5 will result in greater improvement.

While a MOV (Varistor) is shown in the example, any non-linear clamping circuit designed for surge suppression use can be substituted for the MOV in this example, with the transformer parameters optimized for the particular clamping circuit.

Figure 2A:
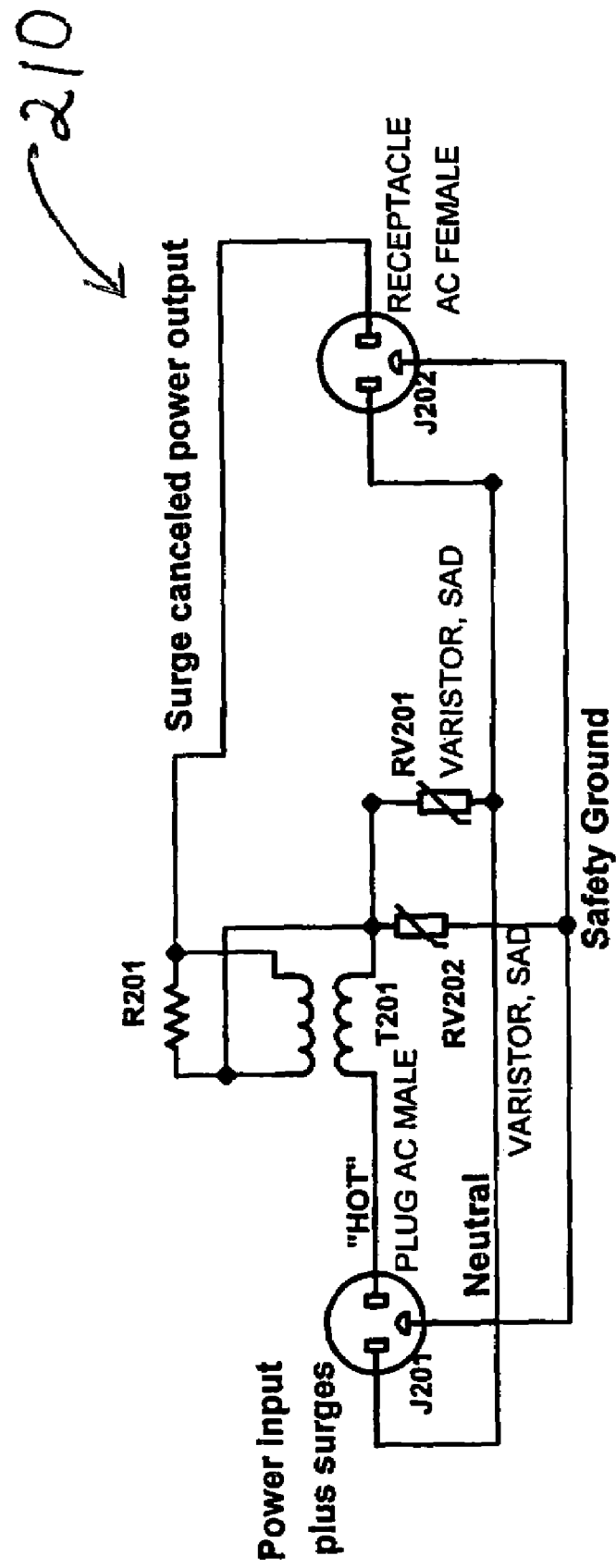
FIGS. 2A and 2B show alternate configurations where the use of the ground line is permissible.
Figure 2B:
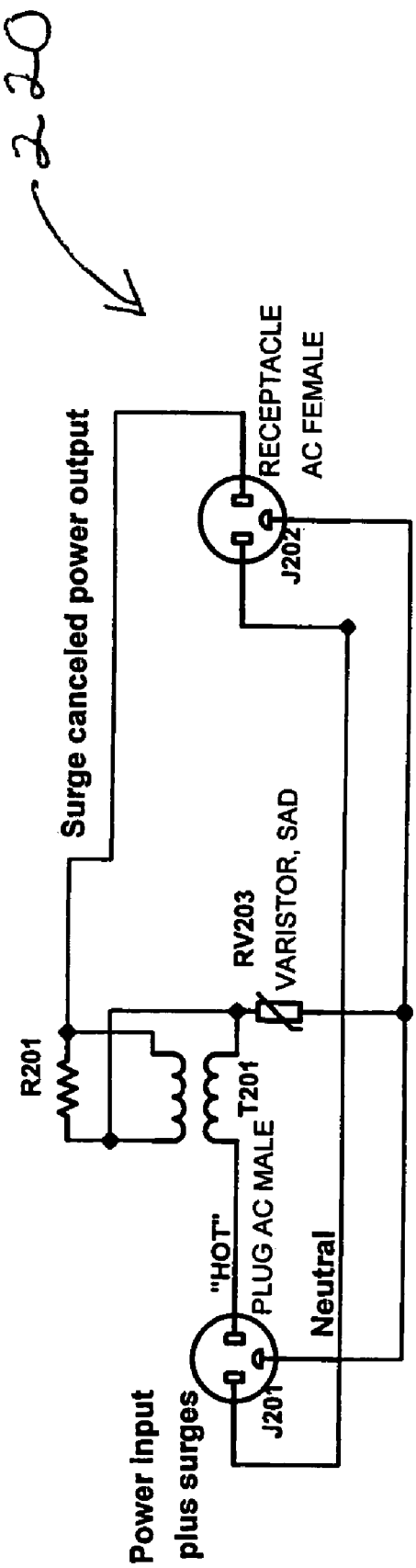

FIGS. 2A and 2B show alternative but less preferred present invention surge protector circuit arrangements 210 and 220. In these embodiments, the ground line is used for connection of a clamping element, as shown.

Figure 3:
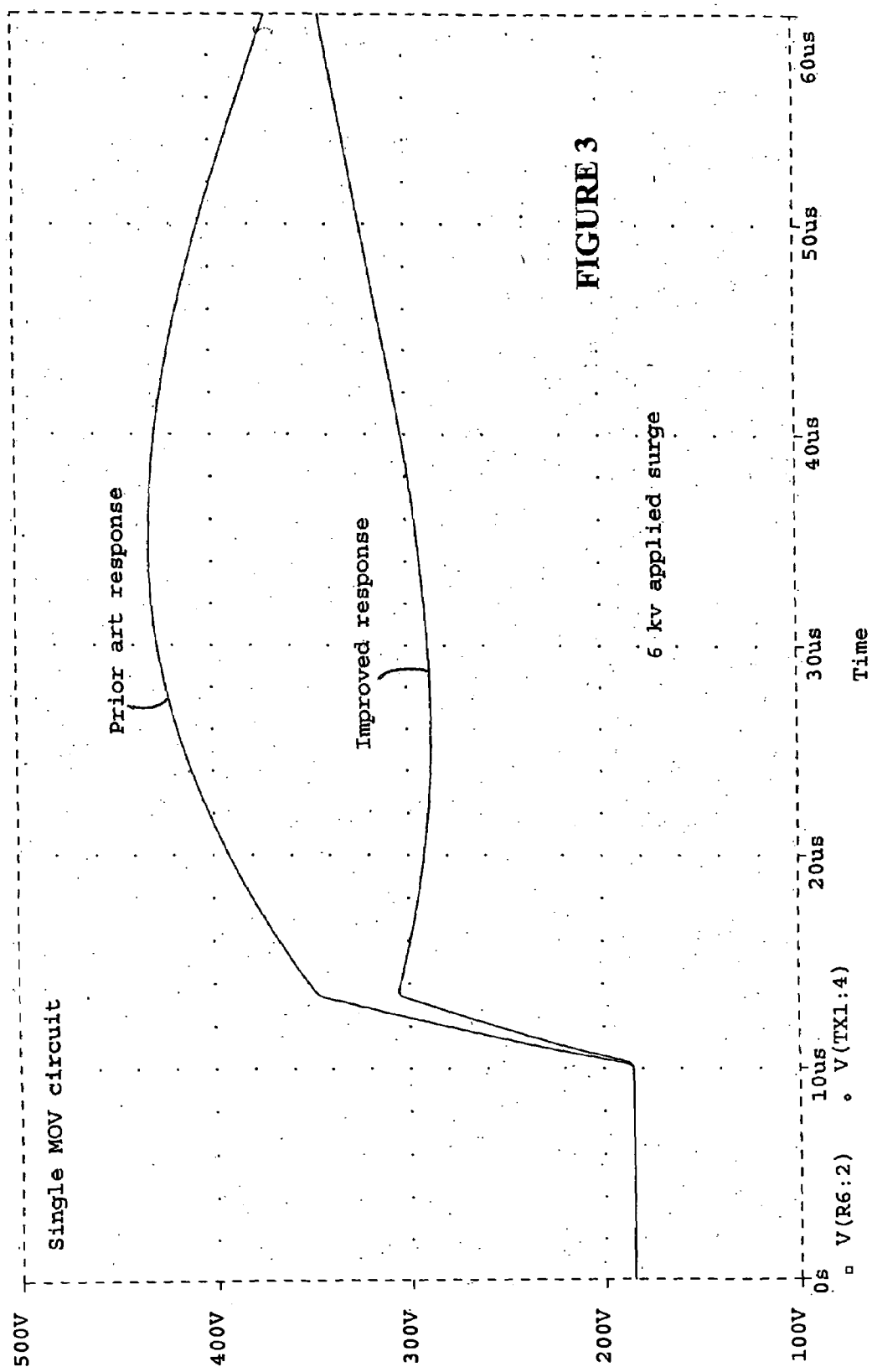

FIG. 3 illustrates before and after voltage waveforms for the MOV circuit at 120 Volts RMS of the present invention device shown in FIG. 2. This Figure shows the significant improvement that is possible with this circuit with the present invention device as compared to this circuit without the present invention device, peak surge was 430 volts, while the results with the present invention device was less then 340 volts.

Figure 5:
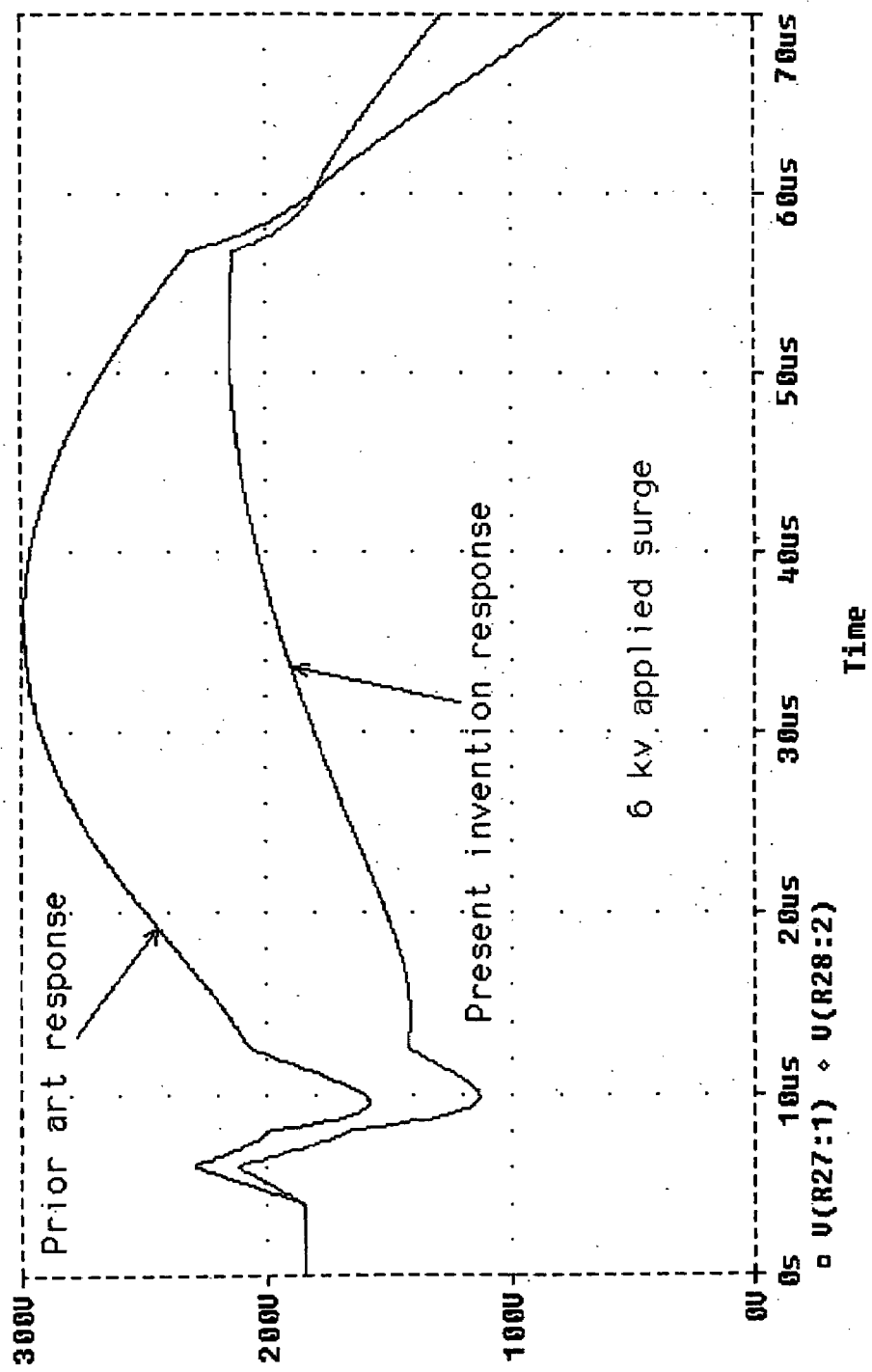

The attached waveforms of FIG. 5 show the performance improvement for a circuit using bridge connected diodes and capacitors, such as are described in U.S. Pat. Nos. 4,870,528, 4,870,534 and 6,728,089. The present invention device results show a surge cap of less than 250 volts, while prior art results show a surge cap up to 310 volts.

Figure 6:
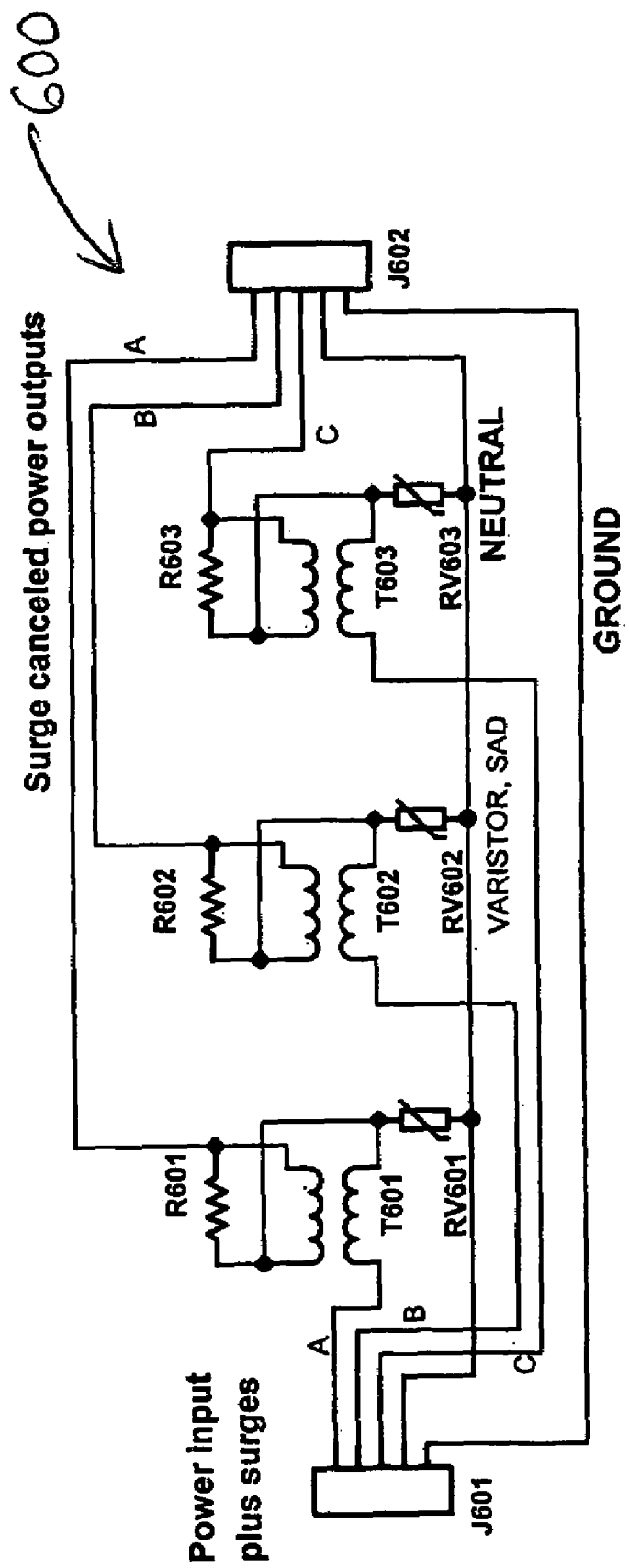

FIG. 6 shows a circuit diagram of a three phase present invention device. Here device 600 includes three series connected transformers, one for each phase. The three phase service has a typical five line set up, with phase A, phase B and phase C hot lines, a safety ground, and a neutral line. The fixed claming elements RV601, RV602 and RV603 can be replaced with dynamic clamping circuits as in FIG. 4A, for improved performance.

Figure 7:
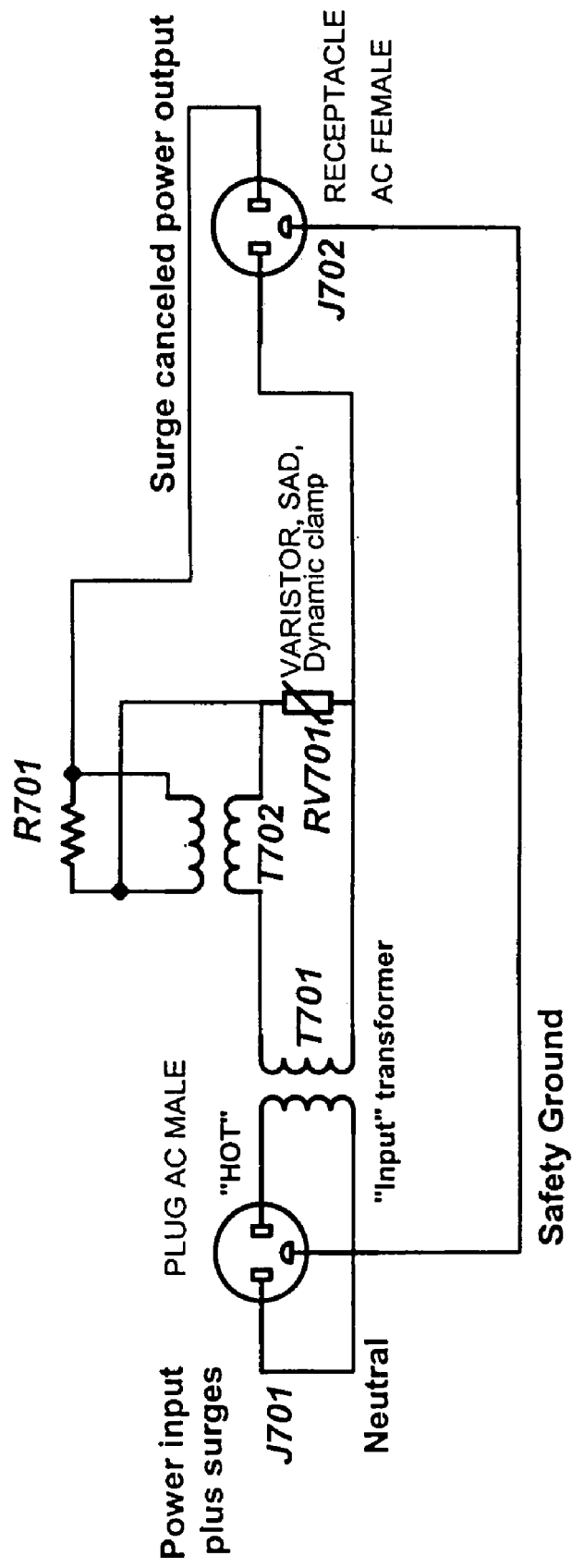
FIGS. 7 and 8 illustrate the present invention with the input transformer, incorporating the features of the previously described drawings.

FIG. 7 shows a circuit diagram of one embodiment of a single phase present invention surge protector 700 for an input transformer and a series-connected transformer and 10 amp, 120 vac 60 Hz load. The components are as follows:

The single phase service 120 vac has a typical three line set up with a hot line, a neutral line, and a safety ground, access via conventional three prong plug is assumed for this example. Thus, the present invention device 700 has a three-prong male AC plug J701, that basically, is a powerline plug for connecting to normal 120 vac 60 Hz power, although the circuit could also be "hard wired" in a panel-mount application or aired circuit having free wires set up for assemblage by an OEM to other components and/or devices.

T701 is a 1200 VA input transformer connected to the hot and neutral lines as shown. T702 is a transformer or autotransformer connected to the secondary winding of the input transformer, and has a primary inductance of 20 microhenries, DC resistance of 0.05 ohms, a secondary inductance of 40 microhenries and a coefficient of coupling of 0.9. R701 is a secondary damping resistor across the T702 transformer secondary winding used to shape the resulting voltage waveform to be consistent with the clamping circuit response, in the range of 1 to 2 ohms, preferred for this arrangement is 1.5 ohms. RV701 is a Metal Oxide Varistor (MOV) or a similar clamping component across the primary winding of the T702 transformer and the secondary winding of the T701 input transformer. RV701 has a nominal clamping onset level of 210 volts peak, typical of varistors for use with 120 vac power. As shown, it is wired consistent with FIG. 1 above, with the addition of the input transformer T701. Comparing this to FIG. 2 components shows the lower primary inductance of the series connected transformer by two thirds. This is the result of the leakage inductance (900 microhenries) of the input transformer T701.

MOVs and SADs (Silicon Avalanche Diodes) have similar clamping characteristics for RV701, but MOVs are sacrificial and wear out with use, while SADs do not wear out up to their maximum rating, but are generally available with lower energy or power ratings. A more effective circuit would be the circuit of FIG. 4A for RV701 in FIG. 7.

Since the neutral wire is tied to earth ground where the power enters a building for 120/240 vac systems as used in the USA, surges can only enter a building on the "hot" wires. The transformer (T702) primary is therefore connected to the T701 secondary incoming "hot" wire downstream from the input transformer, and upstream from the clamping circuit (MOV,SAD, dynamic clamp), so it can monitor the incoming surge current from the input transformer flowing to the clamping circuit. When a surge is present, surge current flows into the input transformer T701, to the series connected transformer T702 primary, producing a canceling signal in the secondary or tapped winding. For a 6,000 volt surge, approximately 5,600 volts will appear briefly across the primary winding of the input transformer. With a MOV clamp onset of 210 volts, and 3,000 amperes surge current available, the voltage across the MOV may climb to about 400 volts due to the momentary high surge current flow. A series connected transformer, such as transformer T702, designed for this application could supply an opposite phase signal of typically 100 volts, reducing the surge passed on to the output receptacle or load from 400 volts peak to 300 volts peak or less, making a dramatic improvement in performance. The series connected transformers, such as transformer T702, will have a nominal coupling of about 0.6 to about 0.95.

While a MOV (Varistor) is shown in the example, any non-linear clamping circuit designed for surge suppression use can be substituted for the MOV in this example, with the transformer parameters optimized for the particular clamping circuit.

Figure 8:
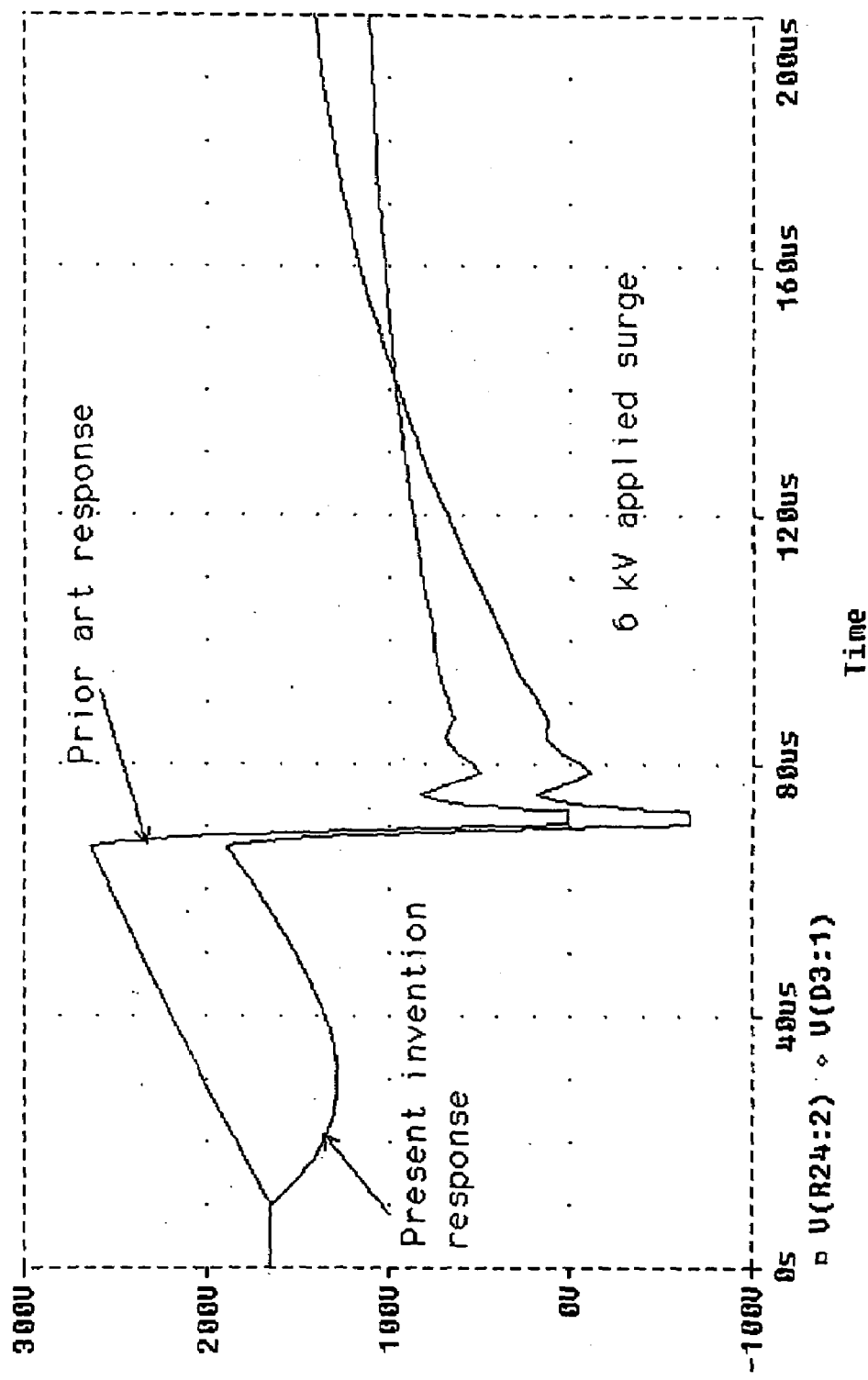

FIG. 8 illustrates waveform results with the present invention surge protector of FIG. 7 utilizing the non-linear surge suppression circuit of FIG. 4A. As shown, peak surge has been reduced by at least 70 volts in these results.

Obviously, numerous modifications and variations of the present invention are possible in light of the above teachings. It is therefore understood that within the scope of the appended claims, the invention may be practiced otherwise than as specifically described herein.

What is claimed is:

1. A surge protector for an alternating current service, said service including at least an incoming hot line and an incoming neutral line, which comprises:
   (a.) an input transformer with input connection means for connection to said incoming hot line;
   (b.) a series connected transformer with input connection means for connection to said incoming hot line downstream from the input transformer secondary winding, and connected in series to a non-linear surge suppression circuit, and therefore having a gross output connection to said non linear surge suppression circuit, and further having a low impedance signal input to the secondary of the series connected transformer from said non-linear surge suppression circuit, and having a surge cancelled hot line output connection means; and,
   (c.) said non-linear surge suppression circuit having an input connection means from said input transformer secondary winding, and being connected with said gross output connection means of said transformer, and having means for returning a suppressed surge signal to said transformer secondary, or tap and having an input transformer secondary winding output connection means;
   wherein the non-linear surge suppression circuit limits the surge voltage at a voltage above the peak of the power wave voltage, and the series connected transformer senses the surge current and the transformer secondary supplies a signal of opposite phase to the incoming surge at the output after the clamping circuit, which effectively cancels the residual surge voltage, rendering the residual surge benign at the output.

2. The surge protector of claim 1 wherein alternating current service includes an incoming hot line, an incoming neutral line and a safety ground line, wherein said device further includes a three prong male alternating current plug at it's upstream end and a three slot female alternating current receptacle at it's downstream end.

3. The surge protector of claim 1 wherein said alternating current service is single phase service, and said service includes an incoming hot line, an incoming neutral line and a safety ground line wherein said series connected transformer has a normal coupling range of about 0.6 to about 0.95.

4. The surge protector of claim 1 wherein said service includes an incoming hot line, an incoming neutral line and a safety ground line of claim 1 wherein said non-linear surge suppression circuit includes a clamp circuit selected from the group consisting of a diode bridge, and MOV and an SAD.

5. The surge protector of claim 1 wherein said input transformer is an isolation transformer.

6. The surge protector of claim 1 wherein said input transformer is an step up voltage transformer.

7. The surge protector of claim 1 wherein said input transformer is an step down voltage transformer.

8. The surge protector of claim 1 wherein said alternating current service is three phase service, and there is at least one of said series connected transformer and said non-linear surge suppression circuit.

9. A surge protector for an alternating current service, said service including at least an incoming hot line and an incoming neutral line and an incoming safety ground line, which comprises:
   (a.) an input transformer with input connection means for connection to said incoming hot line;
   (b.) a series connected transformer with input connection means for connection to said incoming hot line downstream from the input transformer secondary winding, and connected in series to a non-linear surge suppression circuit, and therefore having a gross output connection to said non linear surge suppression circuit, and further having a low impedance signal input to the secondary of the series connected transformer from said non-linear surge suppression circuit, and having a surge cancelled hot line output connection means; and,
   (c.) said non-linear surge suppression circuit having an input connection means from the input transformer secondary winding, and being connected with said gross output connection means of said transformer, and having means for returning a suppressed surge signal to said transformer secondary, or tap and having an input transformer secondary winding output connection means;

wherein the non-linear surge suppression circuit limits the surge voltage at a voltage above the peak of the power wave voltage, and the series connected transformer senses the surge current and the transformer secondary supplies a signal of opposite phase to the incoming surge at the output after the clamping circuit, which effectively cancels the residual surge voltage, rendering the residual surge benign at the output.

10. The surge protector of claim 9 wherein alternating current service includes an incoming hot line, an incoming neutral line and a safety ground line, wherein said device further includes a three prong male alternating current plug at it's upstream end and a three slot female alternating current receptacle at it's downstream end.

11. The surge protector of claim 9 wherein said alternating current service is single phase service, and said service includes an incoming hot line, an incoming neutral line and a safety ground line wherein said series connected transformer has a normal coupling range of about 0.6 to about 0.95.

12. The surge protector of claim 9 wherein said non-linear surge suppression circuit includes a clamp circuit selected from the group consisting of a diode bridge, and MOV and an SAD.

13. The surge protector of claim 9 wherein said input transformer is an isolation transformer.

14. The surge protector of claim 9 wherein said input transformer is an step up voltage transformer.

15. The surge protector of claim 9 wherein said input transformer is an step down voltage transformer.

16. The surge protector of claim 9 wherein said alternating current service is three phase service, and there is at least one of said series connected transformer and said non-linear surge suppression circuit.

* * * * *